May 12, 1925.

R. B. HARTMAN ET AL

BRAKE AND BRAKE LINING

Filed April 9, 1920     4 Sheets-Sheet 1

1,537,234

Inventor
Richard B. Hartman
Charles S. Monson
By Stuart L. Barnes
Attorney

May 12, 1925.
R. B. HARTMAN ET AL
BRAKE AND BRAKE LINING
Filed April 9, 1920
1,537,234
4 Sheets—Sheet 2
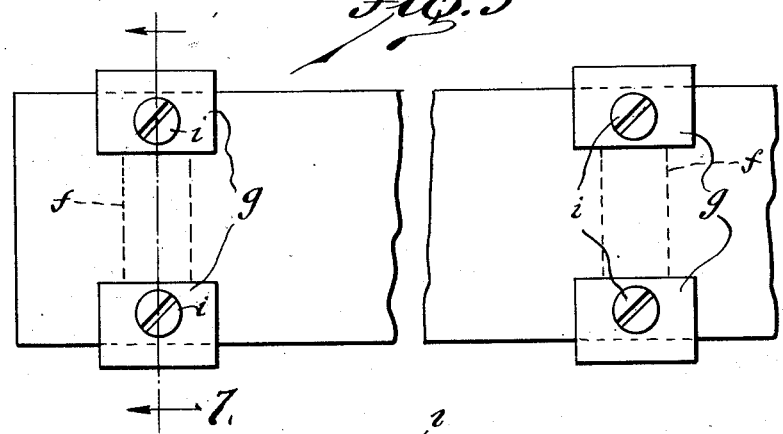
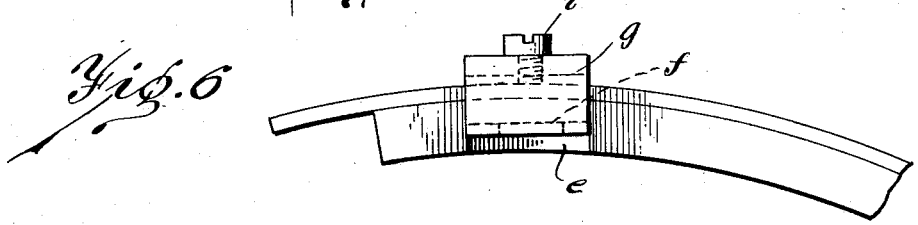
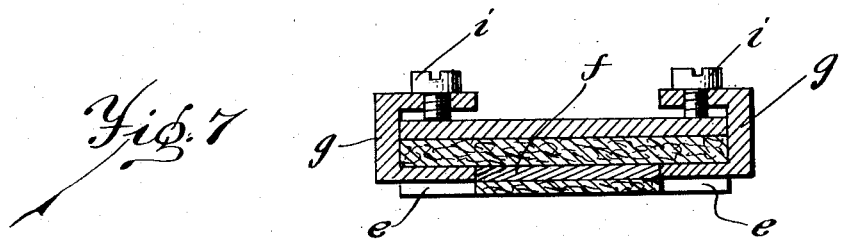
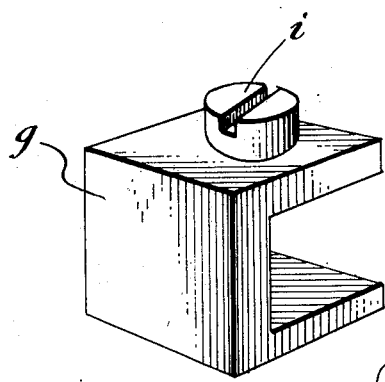
Inventor
Richard B. Hartman
Charles S. Monsom
By Stuart C. Barnes
Attorney May 12, 1925.

R. B. HARTMAN ET AL 1,537,234

BRAKE AND BRAKE LINING

Filed April 9, 1920

Inventor
Richard B. Hartman
Charles S. Morison
By Stuart C. Barnes
Attorney

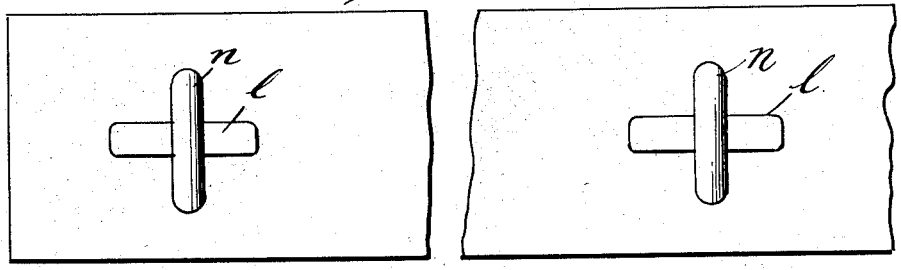
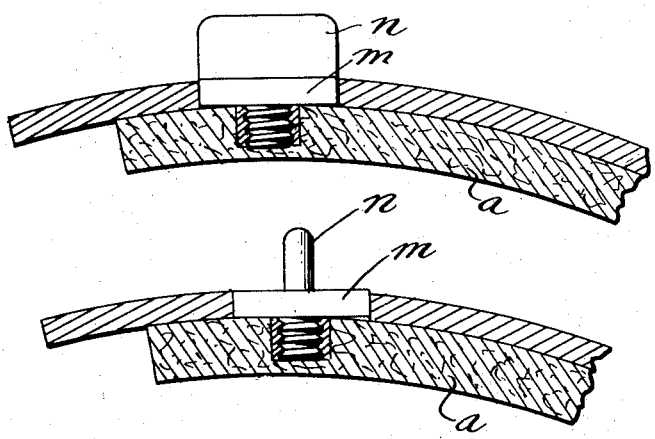
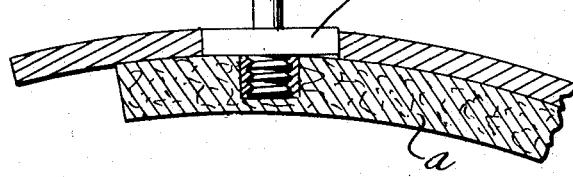
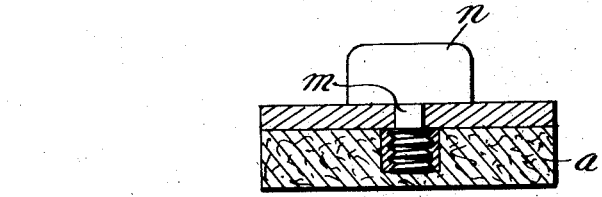
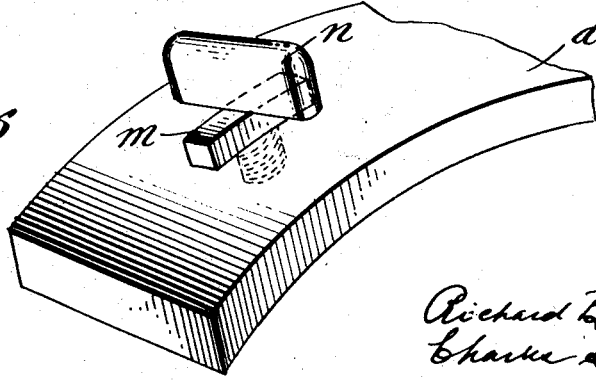

Patented May 12, 1925.

1,537,234

UNITED STATES PATENT OFFICE.

RICHARD B. HARTMAN, OF MIDDLETOWN, OHIO, AND CHARLES S. MONSON, OF DETROIT, MICHIGAN; SAID HARTMAN ASSIGNOR OF HIS ENTIRE RIGHT TO HARTMAN BRAKE CORPORATION.

BRAKE AND BRAKE LINING.

Application filed April 9, 1920. Serial No. 372,629.

*To all whom it may concern:*

Be it known that we, RICHARD B. HARTMAN and CHARLES S. MONSON, citizens of the United States, residing at Middletown and Detroit, respectively, in the counties of Butler and Wayne and States of Ohio and Michigan, respectively, have invented certain new and useful Improvements in Brakes and Brake Linings, of which the following is a specification.

This invention relates to brakes and brake linings, and has for its object a brake lining made up of a plurality of segments in each of which is embedded means by which the segment may be detachably secured to the brake band. This enables the brake lining section to be removed from the brake band while the band is about the drum and either reversed or replaced with a new segment. This greatly facilitates the lining of the brakes and makes it possible for the operator of the car to change or reverse a segment at any time that this becomes necessary. Reversing or replacing can be easily done on the road or in the garage. It, therefore, effects considerable saving in the care of the brakes and the brake linings.

In the drawings,—

Fig. 5 is a plan view of a portion of the brake band showing a modified form of construction.

Fig. 6 is a side elevation of the same.

Fig. 7 is a cross section of this modified form, taken on the line 7—7 of Fig. 5.

Fig. 8 is a perspective view of one of the clamps.

Fig. 12 is a fragmentary plan view showing the brake band with still a further modified form of segment.

Fig. 13 is a longitudinal section of the same.

Fig. 14 is the same kind of a view showing the turn-button turned to hold the segment to the band.

Fig. 15 is a cross section of the same.

Fig. 16 is a fragmentary perspective view of the same.

In companion applications we have described a brake band equipped with a plurality of brake lining segments which may be individually removed and reversed or replaced, greatly facilitating the lining of brakes and putting this work within the province of the operator of the car. It is the object of the present invention to provide a brake lining segment of the same general character but one which has no metal backing for the individual segments such as are described in the applications referred to. The means for assisting in the fastening of the individual segments to the brake band is molded into the segment itself so as to become an integral part of the brake lining segment.

A molded composition material designated *a* forms the lining surface that is adapted to grip the brake drum. This may be a composition containing asbestos fiber or other material. There are a number of compositions already on the market that can be used for this purpose and are advertised for this purpose. Instead of being made up in the form of a complete lining, the brake lining is divided into independent sections *a*. In the form shown in Figs. 1 to 4 inclusive, a flanged threaded socket member *b* is molded into the brake lining segment. Suitable holes *c* are provided in the brake band and the threaded cap screws *d* can be passed through these holes and engaged in the threads of the flanged and threaded socket *b*. It will readily be seen that simply by screwing up these cap screws or loosening these cap screws, a segment may be secured in place or released. Inasmuch as the segments are in the form of segments of cylinders, they may be easily removed between the band and the brake drum while the band embraces the drum. They may then be reversed or replaced.

In the form shown in Figs. 5 to 8 inclusive, notches e are molded in the sides of the segment and running from notch to notch through the center of the molded section is a metal strip f. The jaw clamps g may be passed over the side of the brake band with the lower jaw fitting into the notches e and the edges of the lower jaw abutting against the end of the metal strip f. Screws i may be utilized to tighten the jaw clamps upon the band and hold them in place.

Figure 1:
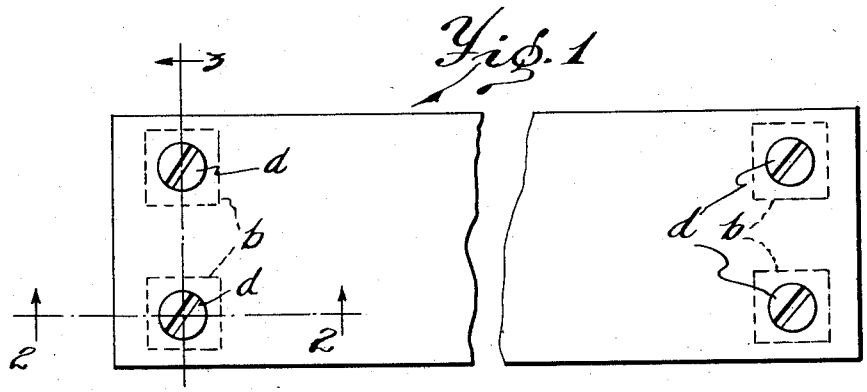
Fig. 1 is a plan view of a brake band equipped with our invention.
Figure 2:
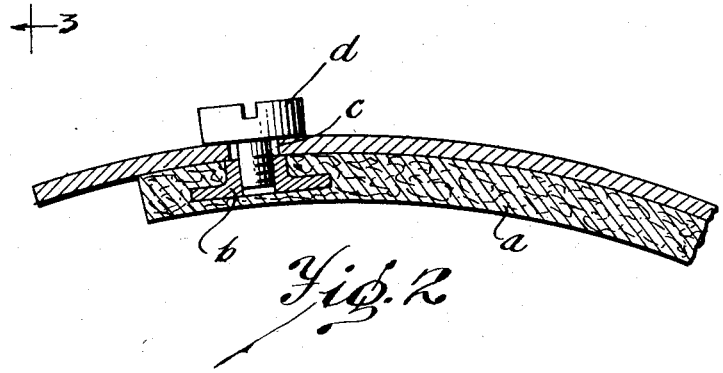
Fig. 2 is a longitudinal section of the same taken on the line 2—2 of Fig. 1.
Figure 3:
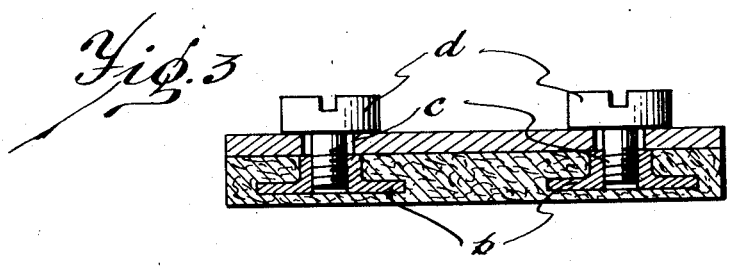
Fig. 3 is a cross section of the same taken on the line 3—3 of Fig. 1.
Figure 4:
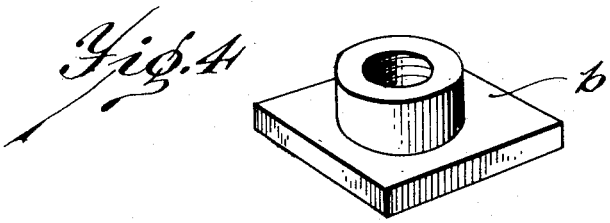
Fig. 4 is a perspective of one of the threaded sockets that is molded in the lining segment.
Figure 9:
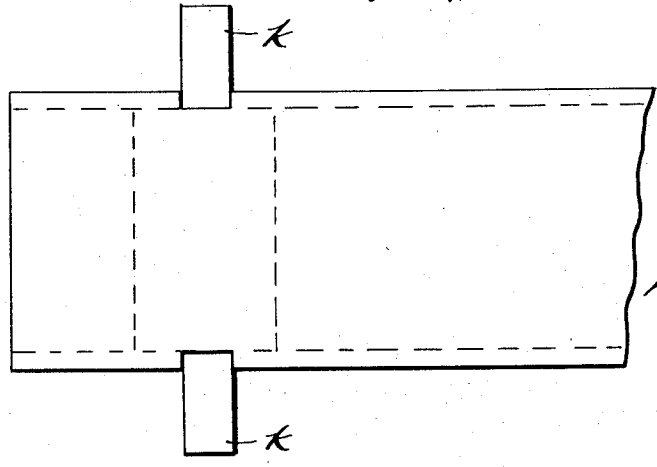
Fig. 9 is a fragmentary plan view of the band showing another modified form of section.
Figure 10:
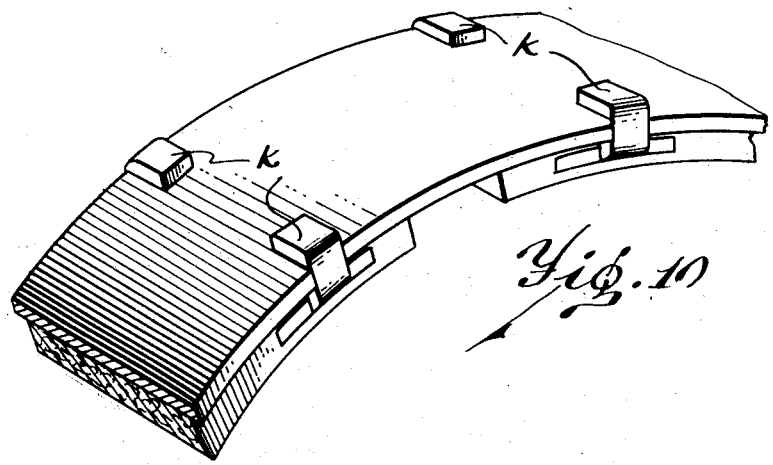
Fig. 10 is a fragmentary perspective of the section after having been clamped to the band.
Figure 11:
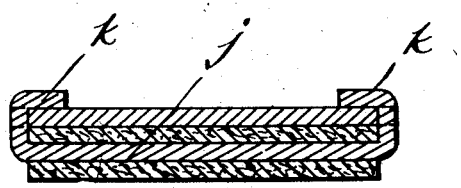
Fig. 11 is a cross section of the same.

In the form shown in Figs. 9 to 11 inclusive, each of the molded sections has molded thereinto a metal strip j with laterally-extending tongues k that may be turned over at the sides to engage in suitable notches in the brake band. These tongues may be bent back and one or more of the sections removed or reversed.

In the form shown in Figs. 12 to 16 inclusive, the brake band is provided with longitudinally-extending slots l. The turn button assembly m may be molded into the segments a and when the rotatable head n of the turn-button parallels the body portion m the turn-button may be passed through the slot l and after having been passed through the slots l the segment may be locked to the brake band by turning the rotatable head around to a right-angular position with respect to the body portion m. In order to allow the wing on the head of the turn-button to slip between the band and drum, it may be made of rubber which allows it to be bent over in slipping the segment under the band.

What we claim is:

1. In a brake, the combination of a brake-band member, and a plurality of removable segments arranged around the band, each segment comprising a moldable fibrous composition material and metal fastening means molded into the molded material by which the same may be removably attached to the brake-band member.

2. In a brake, the combination of a brake-band member, and a plurality of removable elements arranged around the band-member, each element comprising a drum-gripping member in the form of a molded, relatively yieldable composition material, and relatively rigid fastening means molded into the composition material by which the same may be removably attached to the brake-band member.

3. A brake comprising a friction band; a plurality of segmental sections arranged around the band; each section including a body of molded composition; a component of a securing instrumentality disposed therein; said band being provided with a slotted portion in proximity to the securing instrumentality embedded in the segment; and another component of the securing means, including a shank, secured to the first component and having a portion adapted to pass through the slot in the band and be disposed transversely of the slot to secure the segment to the band.

In testimony whereof we affix our signatures.

RICHARD B. HARTMAN.
CHARLES S. MONSON.